(12) United States Patent
Ye et al.

(10) Patent No.: US 10,289,623 B2
(45) Date of Patent: May 14, 2019

(54) METHOD AND SYSTEM FOR KEY KNOWLEDGE POINT RECOMMENDATION

(71) Applicants: PEKING UNIVERSITY FOUNDER GROUP CO., LTD., Beijing (CN); FOUNDER APABI TECHNOLOGY LIMITED, Beijing (CN); PEKING UNIVERSITY, Beijing (CN)

(72) Inventors: Mao Ye, Beijing (CN); Jianbo Xu, Beijing (CN); Zhi Tang, Beijing (CN); Lifeng Jin, Beijing (CN); Yuanlong Wang, Beijing (CN)

(73) Assignees: PEKING UNIVERSITY FOUNDER GROUP CO. LTD., Beijing (CN); FOUNDER APABI TECHNOLOGY LIMITED, Beijing (CN); PEKING UNIVERSITY, Beijing (CN)

( * ) Notice: Subject to any disclaimer, the term of this patent is extended or adjusted under 35 U.S.C. 154(b) by 477 days.

(21) Appl. No.: 15/025,448

(22) PCT Filed: Dec. 6, 2013

(86) PCT No.: PCT/CN2013/088748
§ 371 (c)(1),
(2) Date: Mar. 28, 2016

(87) PCT Pub. No.: WO2015/043073
PCT Pub. Date: Apr. 2, 2015

(65) Prior Publication Data
US 2016/0224564 A1      Aug. 4, 2016

(30) Foreign Application Priority Data

Sep. 29, 2013 (CN) .......................... 2013 1 0456539

(51) Int. Cl.
G06F 17/30 (2006.01)
G06F 16/2457 (2019.01)
G06N 5/00 (2006.01)

(52) U.S. Cl.
CPC .... G06F 16/24578 (2019.01); G06F 17/3053 (2013.01); G06N 5/00 (2013.01)

(58) Field of Classification Search
CPC .............................. G06F 17/3053; G06N 5/00
See application file for complete search history.

(56) References Cited

U.S. PATENT DOCUMENTS

| 6,438,579 | B1 | 8/2002 | Hosken | |
| 8,463,777 | B2* | 6/2013 | Tokashiki | G06F 17/30991 707/727 |

(Continued)

FOREIGN PATENT DOCUMENTS

| CN | 101281530 A | 10/2008 |
| CN | 103077247 A | 5/2013 |
| JP | H 11272684 | 10/1999 |
| JP | 2000200197 | 7/2000 |

(Continued)

OTHER PUBLICATIONS

EP13894664.5-1879—European Extended Search Report dated May 26, 2017.
JP2016-518116—Japanese Office Action dated Jun. 6, 2017.

*Primary Examiner* — Jared M Bibbee
(74) *Attorney, Agent, or Firm* — Brinks Gilson & Lione (57) ABSTRACT

A method and system for key knowledge point recommendation are provided, the method comprising calculating knowledge point relationship strengths of knowledge points in a set of knowledge points; calculating weights for knowledge points according to the knowledge point relationship strengths of knowledge points in the set of knowledge points, and storing the knowledge points and weights correspondingly; determining key knowledge points according to the weights of the knowledge points and recommending (Continued)

the key knowledge points to a user. With this solution, knowledge point relationship strengths are obtained through calculating knowledge point relationship strengths of knowledge points in a set of knowledge points; and recommendation is given to the user for learning knowledge according to knowledge point relationship strengths, so as to help the user to learn key knowledge points selectively in a more objective and effective manner, and avoid problems of information recommendation based on fuzzy logical information recommendation technology.

23 Claims, 3 Drawing Sheets

(56) References Cited

U.S. PATENT DOCUMENTS

| | | | | |
|---|---|---|---|---|
| 9,367,823 | B1* | 6/2016 | Mihalik | G06F 17/3053 |
| 2012/0254310 | A1* | 10/2012 | Kamimaeda | G06F 17/30035 |
| | | | | 709/204 |
| 2012/0303600 | A1* | 11/2012 | Mukhopadhyay | G06F 17/274 |
| | | | | 707/706 |
| 2013/0066921 | A1* | 3/2013 | Mark | G06F 17/30734 |
| | | | | 707/794 |
| 2013/0144875 | A1* | 6/2013 | Hagiwara | G06F 17/3053 |
| | | | | 707/731 |

FOREIGN PATENT DOCUMENTS

| | | |
|---|---|---|
| JP | 2005242807 | 9/2005 |
| JP | 2008123271 | 5/2008 |

* cited by examiner

METHOD AND SYSTEM FOR KEY KNOWLEDGE POINT RECOMMENDATION

CROSS-REFERENCE TO RELATED APPLICATIONS

This application is a national application of PCT/CN2013/088748, filed on Dec. 6, 2013, which application claims a right of priority to Chinese Patent Application No. 201310456539.3, filed Sep. 29, 2013, both of which are incorporated herein by reference in their entirety.

TECHNICAL FIELD

This invention relates a method and system for key knowledge point recommendation, and belongs to the field of digital data processing technology.

DESCRIPTION OF THE RELATED ART

Along with the arrival of knowledge-based economy, digital publication has become an inevitable trend in the publication industry. Many people have shifted from paper reading to electronic reading. A variety of publication resources such as electric books, magazines, digital newspapers contain a lot of authoritative knowledge and have high application value. These digital publication resources commonly spread knowledge and information in the form of documents and articles of books or magazines. What desired by readers is directly obtaining relative key knowledge points from these documents, but not the documents themselves, that is, accurately searching and collecting all relative knowledge points for further research and study.

Key knowledge points are knowledge points having strong relevance to other knowledge points in this field or relative fields. In general, there are some key knowledge points in each field or relative fields. Through learning those key knowledge points, a better understanding of a general view of knowledge in this field and its relative fields may be obtained, thereby facilitating learning of other knowledge point. A large amount of text information resources are available in various fields, with the development of the e-business era, a large amount of key knowledge points are contained in electronic books, magazines and digital newspapers, as a result, fast locating and accurately tracing key knowledge points has become an important problem for users who want to learn certain knowledge.

key knowledge point recommendation methods adopted in the prior art are information recommendation technology based on fuzzy logic, with user profiles stored in fuzzy sets, received information is matched against the user profiles through fuzzy logical inference, so as to select favorite information for a user. The selected information is sorted by favorite degree and then is recommended to the user. However, these information recommendation systems are established based on fuzzy logic, fuzzy logic algorithms have lower accuracy and poor adaptability; meanwhile, these methods need users profiles, and favorite information of users only may be collected and selected after a period of time. Further, users' favorite information changes continuously and it is difficult to trace users' profiles updated in real time; also, these methods may only obtain information or knowledge points of interest, but not key knowledge points.

SUMMARY OF THE INVENTION

A technical problem to be solved in this invention is that the information recommendation systems in the prior art are established based on fuzzy logic, however, fuzzy logic algorithms have lower accuracy and poor adaptability; meanwhile, these methods need users profiles, and favorite information of users may be collected and selected only after a period of time. Further, users' favorite information changes continuously and it is difficult to trace users' profiles updated in real time; also, these methods may only obtain information or knowledge points of interest, but not key knowledge points. Thus, it is desirable to provide a recommendation method and system, in which a knowledge point relationship strength is calculated and key knowledge recommendation is performed for user study according to knowledge point relationship strength, so as to help users to learn key knowledge points selectively in a more objective and effective manner.

In order to solve the above technical problem, the following technical solution is realized in this invention:

A key knowledge point recommendation method comprising the following steps: calculating knowledge point relationship strengths of knowledge points in a set of knowledge points; calculating a weight for each knowledge point according to the knowledge point relationship strengths of knowledge points in the set of knowledge points, and storing the knowledge points and their weights correspondingly; determining key knowledge points according to the weights of the knowledge points and recommending the key knowledge points to a user.

Optionally, the process of calculating knowledge point relationship strengths of knowledge points in a set of knowledge points comprises: calculating knowledge point explicit relationship strengths; calculating knowledge point implicit relationship strengths according to the knowledge point explicit relationship strengths; calculating knowledge point relationship strengths according to knowledge point explicit relationship strengths and knowledge point implicit relationship strengths.

Optionally, the process of calculating knowledge point relationship strengths of knowledge points in a set of knowledge points comprises the following steps: calculating knowledge point explicit relationship strengths of knowledge points in the set of knowledge points and generating a knowledge point relationship strength matrix M; constructing a weighted and directed graph G according to the knowledge point relationship strength matrix; calculating knowledge point implicit relationship strengths according to the weighted and directed graph G and generating a knowledge point implicit relationship strength matrix I; traversing the knowledge point implicit relationship strength matrix I and updating the knowledge point relationship strength matrix M.

Knowledge points in the set of knowledge points and their weights are correspondingly stored in a list L.

Optionally, the process of calculating weights of knowledge points according to the knowledge point relationship strengths of knowledge points in the set of knowledge points and storing the knowledge points and their weights correspondingly comprises: according to knowledge point relationship strength matrix M of knowledge points in the set of knowledge points, obtaining a set $T_i^{out}$ of all edges starting from knowledge point $o_i$ and a set $T_i^{in}$ of all edges ending at knowledge point $o_i$; setting a weight $\omega_i$ of each $o_i$, a weight of each edge in $T_i^{out}$ being multiplied by $\theta^{out}$ and then being added to $\omega_i$, a weight of each edge in $T_i^{in}$ being multiplied by $\theta^{in}$ and then being added to $\omega_i$, the obtained weight $\omega_i$ being stored in a list L, wherein $\theta^{out}$, $\theta^{in}$ are control parameters, and the weight $\omega_i$ of each knowledge point $o_i$ has an initial value setting to zero.

Optionally, the process of determining key knowledge points according to the weights of the knowledge points and recommending the key knowledge points to a user comprises: sorting the knowledge points in descending order of the weight of the knowledge points and updating the list L of the knowledge points; selecting the first K knowledge points from the list L of knowledge points in the set of knowledge points as key knowledge points and recommending these key knowledge points to the user, wherein K is an integer larger than or equal to 2.

Optionally, the process of calculating knowledge point explicit relationship strengths of knowledge points in the set of knowledge points comprises: calculating knowledge point forward explicit relationship strengths of knowledge points in the set of knowledge points; calculating knowledge point backward explicit relationship strengths of knowledge points in the set of knowledge points; calculating knowledge point explicit relationship strengths according to the knowledge point forward explicit relationship strengths and knowledge point backward explicit relationship strengths of knowledge points in the set of knowledge points; generating the knowledge point relationship strength matrix M according to the knowledge point explicit relationship strengths of knowledge points in the set of knowledge points.

The process of traversing the knowledge point implicit relationship strength matrix I and updating the knowledge point relationship strength matrix M comprises: traversing each element in the knowledge point implicit relationship strength matrix I; determining whether $I_{ij}$ is larger than or smaller than $M_{ij}$; if $I_{ij} > M_{ij}$, reassigning $M_{ij} = I_{ij}$ and proceeding to a next element in the knowledge point implicit relationship strength matrix I after updating the knowledge point relationship strength matrix M; if $I_{ij} \leq M_{ij}$, proceeding to a next element in the knowledge point implicit relationship strength matrix I directly, until the knowledge point implicit relationship strength matrix I is traversed.

A key knowledge point recommendation system comprising: a relationship strength calculation module for calculating knowledge point relationship strengths of knowledge points in a set of knowledge points; a weight calculation and storage module for calculating weights of knowledge points according to the knowledge point relationship strengths of the knowledge points in the set of knowledge points, and storing the knowledge points and their weights correspondingly; a recommendation module for determining key knowledge points according to the weights of the knowledge points and recommending the key knowledge points to a user.

Optionally, the relationship strength calculation module is used for calculating knowledge point explicit relationship strengths; calculating knowledge point implicit relationship strengths according to the knowledge point explicit relationship strengths; calculating knowledge point relationship strengths according to knowledge point explicit relationship strengths and knowledge point implicit relationship strengths.

Optionally, the explicit relationship strength calculation module particularly comprises a relationship strength matrix generation unit for calculating knowledge point explicit relationship strengths of the knowledge points in the set of knowledge points and generating a knowledge point relationship strength matrix M; a weighted and directed graph construction unit for constructing a weighted and directed graph G according to the knowledge point relationship strength matrix; implicit relationship strength matrix generation unit for calculating knowledge point implicit relationship strengths according to the weighted and directed graph G and generating a knowledge point implicit relationship strength matrix I; an update unit for traversing the knowledge point implicit relationship strength matrix I and updating the knowledge point relationship strength matrix M.

Knowledge points in the set of knowledge points and their weights are correspondingly stored in a list L.

Optionally, the weight calculation and storage module is used for: according to knowledge point relationship strength matrix M of knowledge points in the set of knowledge points, obtaining a set $T_i^{out}$ of all edges starting from knowledge point $o_i$ and a set $T_i^{in}$ of all edges ending at knowledge point $o_i$; setting a weight $\omega_i$ of each $o_i$, a weight of each edge in $T_i^{out}$ being multiplied by $\theta^{out}$ and then being added to $\omega_i$, a weight of each edge in $T_i^{in}$ being multiplied by $\theta_{in}$ and then being added to $\omega_i$, the obtained weight $\omega_i$ being stored in a list L, wherein $\theta^{out}$, $\theta^{in}$ are control parameters, and the weight $\omega_i$ of each knowledge point $o_i$ has an initial value setting to zero.

Optionally, the recommendation module comprises: a sort submodule for sorting the knowledge points in descending order of the weight of the knowledge points and updating the list L of the knowledge points; a recommendation submodule for selecting the first K knowledge points from the list L of knowledge points in the set of knowledge points as key knowledge points and recommending these key knowledge points to the user, wherein K is an integer larger than or equal to 2.

Optionally, the relationship strength matrix generation unit comprises: a forward explicit relationship strength calculation subunit for calculating knowledge point forward explicit relationship strengths of knowledge points in the set of knowledge points; a backward explicit relationship strength calculation subunit for calculating knowledge point backward explicit relationship strengths of knowledge points in the set of knowledge points; an explicit relationship strength calculation subunit for calculating knowledge point explicit relationship strengths according to the knowledge point forward explicit relationship strengths and knowledge point backward explicit relationship strengths of knowledge points in the set of knowledge points; a relationship strength matrix generation subunit for generating the knowledge point relationship strength matrix M according to the knowledge point explicit relationship strengths of knowledge points in the set of knowledge points.

Optionally, the update unit comprises a search subunit for traversing each element in the knowledge point implicit relationship strength matrix I; a determination subunit for determining whether $I_{ij}$ is larger than or smaller than $M_{ij}$; if $I_{ij} > M_{ij}$, reassigning $M_{ij} = I_{ij}$ and proceeding to a next element in the knowledge point implicit relationship strength matrix I after updating the knowledge point relationship strength matrix M; if $I_{ij} \leq M_{ij}$, proceeding to a next element in the knowledge point implicit relationship strength matrix I directly, until the knowledge point implicit relationship strength matrix I is traversed.

One or more computer readable mediums having stored thereon computer-executable instructions that when executed by a computer perform a key knowledge point recommendation method, the method comprising: calculating knowledge point relationship strength of knowledge points in a set of knowledge points; calculating weights of knowledge points according to the knowledge point relationship strength of knowledge points in the set of knowledge points, and storing the knowledge points and their weights correspondingly; determining key knowledge points according to the weights of the knowledge points and recommending the key knowledge points to a user.

The above technical solutions of this disclosure have one or more following advantages over the prior art:

(1) With the key knowledge point recommendation method of this disclosure, a knowledge point relationship strength is obtained through calculating knowledge point relationship strengths of knowledge points in a set of knowledge points; and recommendation is given to the user for learning knowledge according to knowledge point relationship strengths, so as to help the user to learn key knowledge points selectively in a more objective and effective manner, and avoid the problem in the prior art that information recommendation is based on fuzzy logical information recommendation technology, however, fuzzy logic algorithms have lower accuracy and poor adaptability; meanwhile, these methods need users profiles and it is difficult to trace users' profiles updated in real time; also, these methods may only obtain information or knowledge points of interest, but not key knowledge points.

(2) With the key knowledge point recommendation method of this disclosure, a knowledge point relationship strength is evaluated effectively through measuring relationship strengths of knowledge points in a global space and mapping the relationship strengths of knowledge points into a range [0, 1), in which it is easier to determine the strength level of knowledge point relationship strength.

(3) With the key knowledge point recommendation method of this disclosure, the weight of a knowledge point is the sum of weights of all edges starting from knowledge point $o_i$ and weights of all edges ending at knowledge point $o_i$ in the knowledge point relationship strength matrix M; through calculating weights of knowledge points according to weights of edges in two directions, weights of knowledge points are balanced, leading to improved accuracy of weights of knowledge points.

(4) With the key knowledge point recommendation method of this disclosure, a knowledge point explicit relationship strength is obtained through calculating forward explicit relationship strengths and backward explicit relationship strengths, and this bidirectional relationship strength evaluation method may further improve the accuracy of explicit relationship strength.

(5) With the key knowledge point recommendation method of this disclosure, the explicit relationship matrix is converted to a weighted and directed graph to facilitate the calculation of the shortest distance between knowledge points, which also simplifies the implementation of the algorithm and improves computing efficiency.

(6) With the key knowledge point recommendation method of this disclosure, explicit relationship strengths and implement relationship strengths are calculated using an exponential function and a logarithmic function, a mathematic model is established based on characteristics of those functions and the relationship therebetween, which is advantageous in terms of ingenious conception, simple algorithm and easy implementation.

(7) With the key knowledge point recommendation method of this disclosure, explicit relationship strength values and implicit relationship strength values are stored in an explicit relationship strength matrix and an implicit relationship strength matrix respectively, and may be accessed conveniently in calculation, which may further improve computing speed.

(8) With the key knowledge point recommendation method of this disclosure, a Dijkstra algorithm is used as the method of calculating the shortest simple path length, which is advantageous in terms of fast computing speed, the capability of fast search and improved response speed.

(9) With the key knowledge point recommendation method of this disclosure, a SPFA algorithm is used as the method of calculating the shortest simple path length; this algorithm maintains a queue and source knowledge points are inserted into the queue when the queue is initialized. A knowledge point is taken out of the queue each time to relax its adjacent points; if an adjacent point is relaxed successfully, it is inserted into the queue. The algorithm terminates when the queue is empty. This algorithm is simple, has fast computing speed, and may improve response speed.

(10) With the key knowledge point recommendation method of this disclosure, a Floyd-Warshall algorithm is used as the method of calculating the shortest simple path length; with this algorithm, the shortest path between any two points may be calculated; this algorithm may be used in any graphs, including directed graphs, graphs having negative weighted edges, and may obtain the shortest path through finding the shortest sub-paths. This algorithm may be implemented easily, has fast computing speed and improved response speed.

(11) With the key knowledge point recommendation method of this disclosure, a Bellman-Ford algorithm is used as the method of calculating the shortest simple path length; this algorithm is suitable for single-source shortest path calculation and is easy to program and implement.

(12) With the key knowledge point recommendation method of this disclosure, a control factor $\beta$ is set for the calculation of forward explicit relationship strength. Through setting a control factor $\beta$, the influence on explicit relationship strength caused by the value of $\mu$ may be effectively controlled; the value of the control factor $\beta$ is selected according to the characteristic of the set of knowledge points to find a control factor $\beta$ for optimization. In general, a good effect may be achieved when the control factor $\beta$ is set to 1.

(13) With the key knowledge point recommendation method of this disclosure, an association factor $\alpha$ is set for the calculation of backward explicit relationship strength. Through setting the association factor $\alpha$, the influence on backward explicit relationship caused forward explicit relationship may be effectively controlled; $1 \leq \alpha \leq 5$, and different values may be selected according to the characteristic of the set of knowledge points. In general, a better effect may be achieved when the association factor $\alpha$ is set to 2.

(14) With the key knowledge point recommendation method of this disclosure, control parameters $\theta^{in}$, $\theta^{out}$ are set for the calculation of weights of knowledge points. Control parameters $\theta^{out}$, $\theta^{in}$ are used to control edges starting from knowledge point $o_i$ edges ending at $o_i$ respectively to adjust their contributions to the weight of knowledge point $o_i$. If the control parameters $\theta^{out}$, $\theta^{in}$ have a larger difference in their values, those edges have a larger difference in their contributions; if control parameters $\theta^{out}$, $\theta^{in}$ have a smaller difference in their values, those edges have a smaller difference in their contributions. When the control parameter $\theta^{out}$ has a larger value, key knowledge points will have stronger generality and versatility, and vice verse. When the control parameter $\theta^{in}$ has a larger value, key knowledge points will have higher popularity, and vice verse. $\theta^{out} \in [0.1, 10]$ and $\theta^{in} \in [0.1, 10]$, if $\theta^{out}=1$ and $\theta^{in}=2$, a better control effect may be achieved. The values of the control parameters $\theta^{out}$, $\theta^{in}$ may be set according the characteristic of the set of knowledge points to realize AI intervention.

(15) With the key knowledge point recommendation method of this disclosure, the first K knowledge points in the list L of knowledge points are used as key knowledge points and are recommended to the user, K being in a range of 2≤K≤45. A different threshold may be selected according to the characteristic of the set of knowledge points, and may be adjusted by users as needed; meanwhile, users may select their favorite knowledge points from the recommended key knowledge points.

(16) In the key knowledge point recommendation system of this disclosure, with the key knowledge point recommendation method above, The problem in the prior art may be effectively avoided, i.e., information recommendation in the prior art is based on fuzzy logical information recommendation technology, however, fuzzy logic algorithms have lower accuracy and poor adaptability; meanwhile, these methods need users profiles and it is difficult to trace users' profiles updated in real time; also, these methods may only obtain information or knowledge points of interest, but not key knowledge points.

BRIEF DESCRIPTION OF THE DRAWINGS

For an easier and clear understanding of this invention, a further description of this invention will be given below with reference to the accompanying drawings, in which.

DETAILED DESCRIPTION OF THE PREFERRED EMBODIMENT

Embodiment 1

Figure 1:
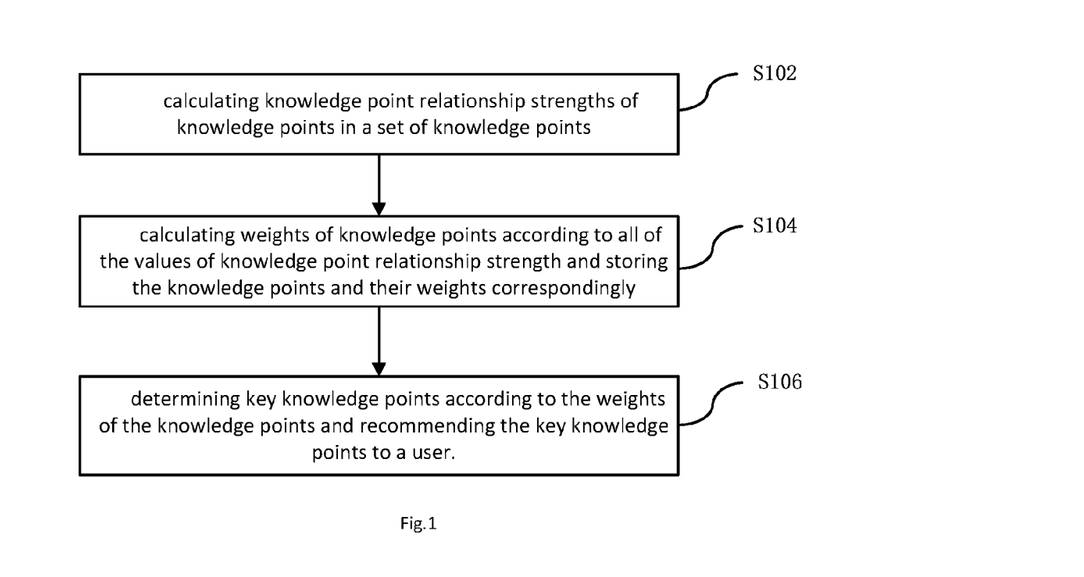
FIG. 1 is a flowchart of the key knowledge point recommendation method according to an embodiment of this invention.

A key knowledge point recommendation method is provided in this embodiment, a flowchart thereof is shown in FIG. 1. Herein, knowledge points are knowledge interaction units, representing concepts or entities, such as "Qin Shi-Huang", "Tang Dynasty", "Hundred Days' Reform". A set of knowledge points is a set of knowledge points in part of a field, or a field and its relative fields. In this embodiment, the names of knowledge points and their relevant text are shown in Table 1 below. As shown in Table 1, there are three knowledge points, which are labeled as A, B and C for the convenience of description. N is a block of text that does not include the names of knowledge points A, B and C.

TABLE 1

Names of knowledge points and their relevant text

| Names of knowledge points | Relevant text |
| --- | --- |
| A | NANBNBN |
| B | NANCN |
| C | NNN |

The key knowledge point recommendation method comprises the following steps:

S102: calculating knowledge point relationship strengths of knowledge points in a set of knowledge points. In an embodiment, calculating knowledge point relationship strengths of knowledge points in a set of knowledge points comprises: first, calculating knowledge point explicit relationship strengths; then calculating knowledge point implicit relationship strengths based on the knowledge point explicit relationship strengths; at last calculating knowledge point relationship strengths based on the knowledge point explicit relationship strengths and the knowledge point implicit relationship strengths.

Below, a detail introduction of a particular implementation will be given. The process of calculating knowledge point relationship strengths of knowledge points in a set of knowledge points comprises the following steps:

(I) calculating knowledge point explicit relationship strengths of all knowledge points in a set of knowledge points and generating a knowledge point relationship strength matrix M.

A particular process comprises:

(1) calculating knowledge point forward explicit relationship strengths, wherein the knowledge point forward explicit relationship strength is:

$$f_P(i, j) = \frac{2}{1 + \exp(-\beta\mu)} - 1$$

Wherein, $f_p$ (i,j) is the forward explicit relationship strength from knowledge point $o_i$ to knowledge point $o_j$, μ is the number of times knowledge point $o_j$ appears in the relevant text of knowledge point $o_i$, β is a control factor, 0.5≤β≤2, μ, i, j are non-negative integers, i, j=1, 2, . . . n, n is the number of knowledge points.

In this embodiment, the control factor β may be set to different values, such as 0.5, 0.7, 1.2, 1.5. The control factor β controls the influence of the value of μ on explicit relationship strength. Users may select the value of the control factor β according to the characteristic of the set of knowledge points and may find an optimal control factor β according to the characteristic of the set of knowledge points.

As shown in Table 1, knowledge point B appears two times in the relevant text of knowledge point A, forward explicit relationship strength $f_p$ (A, B) from knowledge point A to knowledge point B is:

$$f_P(A, B) = \frac{2}{1 + \exp(-\beta\mu)} - 1 = \frac{2}{1 + \exp(-2)} - 1$$

(2) calculating knowledge point backward explicit relationship strengths, wherein the knowledge point backward explicit relationship strength is:

$$f_N(i, j) = \frac{f_P(j, i)}{\alpha}$$

Wherein, $f_N$ (i,j) is the backward explicit relationship strength from knowledge point $o_i$ to knowledge point $o_j$, α is an association factor, 1≤α≤5, α is a positive integer; $f_p$ (j,i) is forward explicit relationship strength from knowledge point $o_j$ to knowledge point $o_i$.

In this embodiment, the association factor α is set to 2. In other embodiments, the association factor α may be set to different values, such as 1, 1.5, 3, 4, 5. The association factor α controls the influence of forward explicit relationship strength on backward explicit relationship strength, the smaller value of α, the greater influence caused by forward explicit relationship strength on backward explicit relationship strength, and the larger value of α, the smaller influence caused by forward explicit relationship strength on backward explicit relationship strength.

In Table 1, the backward explicit relationship strength $f_N$ (A, B) from knowledge point A to knowledge point B is:

$$f_N(A, B) = \frac{f_P(B, A)}{\alpha} = \left(\frac{2}{1 + \exp(-1)} - 1\right)/2$$

(3) calculating knowledge point explicit relationship strengths according to the knowledge point forward explicit relationship strengths and the knowledge point backward explicit relationship strengths, wherein the knowledge point explicit relationship strength is calculated as follows:

$$f_E(i, j) = \frac{\alpha(f_P(i, j) + f_N(i, j))}{1 + \alpha}$$

Wherein, $f_E$ (i,j) is the explicit relationship strength from knowledge point $o_i$ to knowledge point $o_j$, $f_p$ (i,j) is the forward explicit relationship strength from knowledge point $o_i$ to knowledge point $o_j$, $f_N$ (i,j) is the backward explicit relationship strength from knowledge point $o_i$ to knowledge point $o_j$, α is an association factor, 1≤α≤5, and α is a positive integer.

If there is not an explicit relationship from knowledge point $o_i$ to knowledge point $o_j$, $E_{ij}$ is zero. In this embodiment, the explicit relationship strength from a knowledge point to itself is set to 0. In other embodiments, the explicit relationship strength from a knowledge point to itself may be set to 1, which however does not have a practical meaning.

In Table 1, explicit relationship strength f (A, B) from knowledge point A to knowledge point B is:

$$f_E(A, B) = \frac{\alpha(f_P(A, B) + f_N(A, B))}{1 + \alpha} = \frac{2(f_P(A, B) + f_N(A, B))}{1 + 2} = 0.6617684897238464$$

An explicit relationship strength between knowledge point A, knowledge point B and knowledge point C is calculated in sequence according to the two steps above.

With the key knowledge point recommendation method of this embodiment, a knowledge point explicit relationship strength is obtained through calculating a forward explicit relationship strength and a backward explicit relationship strength, and this bidirectional relationship strength evaluation method may further improve the accuracy of explicit relationship strength.

With the key knowledge point recommendation method of this embodiment, explicit relationship strength and implement relationship strength are calculated using an exponential function and a logarithmic function, a mathematic model is established based on characteristics of those functions and the relationship therebetween, which is advantageous in terms of ingenious conception, simple algorithm and easy implementation.

(4) generating a knowledge point relationship strength matrix M according to the explicit relationship strength values of all knowledge points.

As shown in Table 2, a knowledge point relationship strength matrix M (in which explicit relationship strength values are stored at this point) is generated according to the explicit relationship strength values between knowledge points A, B and C shown in Table 1.

TABLE 2

| Knowledge point relationship strength matrix M (with explicit relationship strength values stored therein) | | | |
|---|---|---|---|
| | A | B | C |
| A | 0 | 0.6617684897238464 | 0 |
| B | 0.5619428234919281 | 0 | 0.30807810484000653 |
| C | 0 | 0.15403905242000326 | 0 |

(II) constructing a weighted and directed graph G according to the knowledge point relationship strength matrix The weighted and directed graph G comprises edges, weights and vertices.

Wherein, edges and weights are set in the following method.

If $M_{ij}>0$, the weight of an edge from knowledge point $o_i$ to knowledge point $o_j$ is set to $-\ln(M_{ij})$; if $M_{ij}=0$, there is not an edge from knowledge point $o_i$ to knowledge point $o_j$ in G, wherein $M_{ij}$ represents explicit relationship strength from knowledge point $o_i$ to knowledge point $o_j$;

The weighted and directed graph G has the same vertices with M. In this invention, the explicit relationship matrix is converted to a weighted and directed graph to facilitate the calculation of the shortest distance between knowledge points, which also simplifies the implementation of the algorithm and improves computing efficiency. The weighted and directed graph G in this embodiment is represented as a matrix. A weighted and directed graph G constructed based on the knowledge point relationship strength matrix shown in Table 2 is shown in Table 3.

TABLE 3

| weighted and directed graph G | | | |
|---|---|---|---|
| | A | B | C |
| A | null | 0.4128394976172101 | null |
| B | 0.5763551718229092 | null | 1.177401941013469 |
| C | null | 1.8705491215734142 | null |

Null in table 3 represents there is not an edge.

Figure 2:
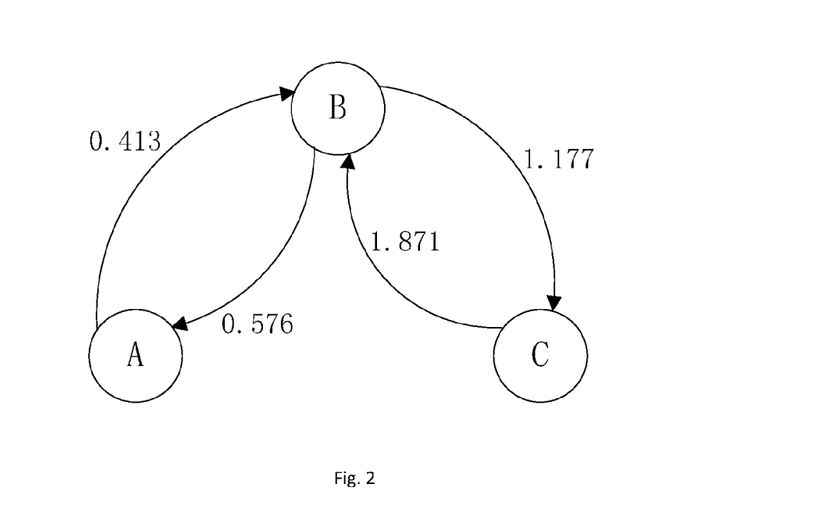
FIG. 2 is a schematic diagram of a weighted and directed graph according to an embodiment of this invention.

As an alternative embodiment, the weighted and directed graph G may be represented as that in FIG. 2. As shown in FIG. 2, explicit relationship between knowledge points may be visually represented as edges having weight values, and knowledge points are vertices of the weighted and directed graph G.

(III) calculating knowledge point implicit relationship strengths according to the weighted and directed graph G and generating a knowledge point implicit relationship strength matrix I.

A knowledge point implicit relationship strength is:

$$f_I(i,j) = \exp(-C_{ij})$$

Wherein, $f_I$ (i,j) represents the implicit relationship strength from knowledge point $o_i$ to knowledge point $o_j$, $C_{ij}$ represents the shortest path length from knowledge point $o_i$ to knowledge point $o_j$ in the weighted and directed graph G. If there is not a simple path from knowledge point $o_i$ to knowledge point $o_j$, $f_I$ (i,j)=0; the value of implicit relationship strength from a knowledge point to itself is set to 0; the values of implicit relationship strength $f_I$ (i,j) are stored in a matrix to generate a knowledge point implicit relationship strength matrix I.

A Dijkstra algorithm may be used to calculate the shortest simple path length $C_{ij}$, which has fast computing speed, and may realize fast search and improved response speed.

The knowledge point implicit relationship strength matrix I generated based on implicit relationship strength between knowledge points A, B and C as shown in Table 1 is shown in Table 4.

TABLE 4

Implicit relationship strength matrix

|   | A | B | C |
|---|---|---|---|
| A | 0 | 0.6617684897238464 | 0.20387638215695592 |
| B | 0.5619428234919281 | 0 | 0.30807810484000653 |
| C | 0.08656114004491779 | 0.1540390524200033 | 0 |

(IV) traversing the knowledge point implicit relationship strength matrix I and updating the knowledge point relationship strength matrix M. Particularly, this process comprises:

traversing each element in the implicit relationship strength matrix I;

determining whether $I_{ij}$ is larger than or smaller than $M_{ij}$;

if $I_{ij} > M_{ij}$, updating the knowledge point relationship strength matrix M through reassigning $M_{ij} = I_{ij}$ and proceeding to a next element in the knowledge point implicit relationship strength matrix I; if $I_{ij} \leq M_{ij}$, proceeding to a next element in the knowledge point implicit relationship strength matrix I directly, until each element of the implicit relationship strength matrix I has been traversed.

Table 5 shows updated values of relationship strength between knowledge points A, B, C of FIG. 1

TABLE 5

Relationship strength matrix

|   | A | B | C |
|---|---|---|---|
| A | 0 | 0.6617684897238464 | 0.20387638215695592 |
| B | 0.5619428234919281 | 0 | 0.30807810484000653 |
| C | 0.08656114004491779 | 0.1540390524200033 | 0 |

It can be seen from Table 5 that multiple values in Table 2 have been updated by implicit relationship strength, and all values of relationship strength are within a range of [0, 1).

With the key knowledge point recommendation method of this embodiment, explicit relationship strengths and implement relationship strengths are calculated using an exponential function and a logarithmic function, a mathematic model is established based on characteristics of those functions and the relationship therebetween, which is advantageous in terms of ingenious conception, simple algorithm and easy implementation.

With the key knowledge point recommendation method of this embodiment, explicit relationship strength values and implicit relationship strength values are stored in an explicit relationship strength matrix and an implicit relationship strength matrix respectively, and may be accessed conveniently in calculation, which may further improve computing speed.

S104: calculating weights of knowledge points according to all of the values of knowledge point relationship strength and storing the knowledge points and their weights correspondingly. A particular process comprises:

according to the knowledge point relationship strength matrix M, obtaining a set $T_i^{out}$ of all edges starting from knowledge point $o_i$ and a set $T_i^{in}$ of all edges ending at knowledge point $o_i$; calculating a weight $\omega_A$ of knowledge point A; obtaining a set of $T_A^{out} = \{(A, B), (A, C)\}$ of all edges starting from A and a set $T_A^{in} = \{(B, A), (C, A)\}$ of all edges ending at A; calculating a weight $\omega_A$ of knowledge point A;

setting the weight of each $o_i$ to the weight $\omega_i$ of each edge in $T_i^{out}$ being multiplied by $\theta^{out}$ and then being added to $\omega_i$, the weight of each edge in $T_i^{in}$ being multiplied by $\theta^{in}$ and then being added to $\omega_i$, the obtained weight $\omega_i$ being stored in a list L, wherein $\theta^{out}$, $\theta^{in}$ are control parameters, and the weight $\omega_i$ of each knowledge point $o_i$ has an initial value setting to zero.

An edge (A,B) is obtained from $T_A^{out}$, the initial value of $\omega_A$ is set to 0, and the weight of this edge is multiplied by $\theta^{out}$, and then is added to $\omega_A$, wherein the value of $\theta^{out}$ is 1, so as to obtain $\omega_A = 0 + 0.6617684897238464*1 = 0.6617684897238464$; this calculation is performed on all edges in $T_A^{out}$ and $\omega_A = 0.86564487188080232$ is obtained; an edge (B,A) is obtained from $T_A^{in}$ and the weight of this edge is multiplied by $\theta^{in}$, and then is added to $\omega_A$, wherein the value of $\theta^{out}$ is 2, so as to obtain $\omega_A = 0.86564487188080232 + 0.5619428234919281*2 = 1.98953051886465852$; this calculation is performed on all edges in $T_A^{in}$ and $\omega_A = 2.162652798954494$ is obtained. Similarly, weights corresponding to knowledge points A, B, C are obtained, $\omega_A = 2.162652798954494$, $\omega_B = 2.501636012619634$, $\omega_C = 1.264509166458846$.

Control parameters $\theta^{out} \in [0.1, 10]$, $\theta^{in} \in [0.1, 10]$. In this embodiment, $\theta^{out}=1$, $\theta^{in}=2$. In other embodiments, $\theta^{out}$, $\theta^{in}$ may have other different values, such as 0.5, 1.5, 2.5, 3, 3.7, 5, 7, 9. Taking equalization (balance of edge weights) into account, control parameters $\theta^{out}$, $\theta^{in}$ are used to control edges starting from knowledge point $o_i$ and edges ending at knowledge point $o_i$ to adjust their contributions to the weight of knowledge point $o_i$. If the control parameters $\theta^{out}$, $\theta^{in}$ have a larger difference in their values, those edges have a larger difference in their contributions; if control parameters $\theta^{out}$, $\theta^{in}$ have a smaller difference in their values, those edges have a smaller difference in their contributions. When the control parameter $\theta^{out}$ has a larger value, key knowledge points will have stronger generality and versatility, and vice verse. When the control parameter $\theta^{in}$ has a larger value, key knowledge points will have higher popularity, and vice verse. The values of the control parameters $\theta^{out}$, $\theta^{in}$ may be set according the characteristic of the set of knowledge points to realize AI intervention.

S106: determining key knowledge points according to the weights of the knowledge points and recommending the key knowledge points to a user. knowledge points and their weights are correspondingly stored in a list L. in an embodiment, this process particularly comprises:

sorting the knowledge points in descending order of the weight of the knowledge points and updating the list L of the knowledge points, so as to obtain a list $L=\omega_B \; \omega_A \; \omega_C$ of knowledge points.

selecting the first K knowledge points from the list L of knowledge points and recommending these knowledge points to the user as knowledge points, wherein K is an integer larger than or equal to 2 and less than the number of all of the knowledge points. in general, K has a value in a range of $2 \leq K \leq 45$; a different threshold may be selected according to the characteristic of the set of knowledge points, and may be adjusted by users as needed; meanwhile, users may select their favorite knowledge points from the recommended key knowledge points.

In this embodiment, K is set to 2 so that the first two knowledge points $\omega_B \; \omega_A$, are selected from the list L of knowledge points. These two knowledge points are key knowledge points.

Embodiment 2

Except for the process of calculating knowledge point implicit relationship strength based on the weighted and directed graph G and generating a knowledge point implicit relationship strength matrix I, other steps of this embodiment are the same as that of embodiment 1.

The process of calculating knowledge point implicit relationship strengths based on the weighted and directed graph G and generating a knowledge point implicit relationship strength matrix I comprises:

knowledge point implicit relationship strength $f_I(i,j)=\exp(-C_{ij})$, wherein $f_I(i,j)$ represents the implicit relationship strength from knowledge point $o_i$ to knowledge point $o_j$, $C_{ij}$ represents the shortest path length from knowledge point $o_i$ to knowledge point $o_j$ in the weighted and directed graph G. If there is not a simple path from knowledge point $o_i$ to knowledge point $o_j$, $f_I(i,j)=0$; the value of implicit relationship strength from a knowledge point to itself is set to 0; the values of implicit relationship strength $f_I(i,j)$ are stored in a matrix to generate a knowledge point implicit relationship strength matrix I.

A SPFA algorithm is used as the method of calculating the shortest simple path length. This algorithm maintains a queue and source knowledge points are inserted into the queue when the queue is initialized. A knowledge point is taken out of the queue each time to relax its adjacent points; if an adjacent point is relaxed successfully, it is inserted into the queue. The algorithm terminates when the queue is empty. This algorithm is simple, has fast computing speed, and may improve response speed.

Embodiment 3

Except for the process of calculating knowledge point implicit relationship strength based on the weighted and directed graph G and generating a knowledge point implicit relationship strength matrix I, other steps of this embodiment are the same as that of embodiment 1.

The process of calculating knowledge point implicit relationship strengths based on the weighted and directed graph G and generating a knowledge point implicit relationship strength matrix I comprises:

knowledge point implicit relationship strength $f_I(i,j)=\exp(-C_{ij})$, wherein $f_I(i,j)$ represents the implicit relationship strength from knowledge point $o_i$ to knowledge point $o_j$, $C_{ij}$ represents the shortest path length from knowledge point $o_i$ to knowledge point $o_j$ in the weighted and directed graph G. If there is not a simple path from knowledge point $o_i$ to knowledge point $o_j$, $f_I(i,j)=0$; the value of implicit relationship strength from a knowledge point to itself is set to 0; the values of implicit relationship strength $f_I(i,j)$ are stored in a matrix to generate a knowledge point implicit relationship strength matrix I.

A Floyd-Warshall algorithm is used as the method of calculating the shortest simple path length. With this algorithm, the shortest path between any two points may be calculated. This algorithm may be used in any graphs, including directed graphs, graphs having negative weighted edges, and may obtain the shortest path through finding the shortest sub-paths. This algorithm may be implemented easily, has fast computing speed and improved response speed.

Embodiment 4

Except for the process of calculating knowledge point implicit relationship strength based on the weighted and directed graph G and generating a knowledge point implicit relationship strength matrix I, other steps of this embodiment are the same as that of embodiment 1.

The process of calculating knowledge point implicit relationship strength based on the weighted and directed graph G and generating a knowledge point implicit relationship strength matrix I comprises:

knowledge point implicit relationship strength $f_I(i,j)=\exp(-C_{ij})$, wherein $f_I(i,j)$ represents the implicit relationship strength from knowledge point $o_i$ to knowledge point $o_j$, $C_{ij}$ represents the shortest path length from knowledge point $o_i$ to knowledge point $o_j$ in the weighted and directed graph G. If there is not a simple path from knowledge point $o_i$ to knowledge point $o_j$, $f_I(i,j)=0$; the value of implicit relationship strength from a knowledge point to itself is set to 0; the values of implicit relationship strength $f_I(i,j)$ are stored in a matrix to generate a knowledge point implicit relationship strength matrix I.

A Bellman-Ford algorithm is used as the method of calculating the shortest simple path length. This algorithm is suitable for single-source shortest path calculation and is easy to program and implement.

The key knowledge point recommendation method provided in this embodiment comprises steps: calculating knowledge point relationship strength of knowledge points in a set of knowledge points; calculating weights of knowledge points according to the knowledge point relationship strength of knowledge points in the set of knowledge points, and storing the knowledge points and their weights correspondingly; determining key knowledge points according to the weights of the knowledge points and recommending the key knowledge points to a user. In this method, knowledge point relationship strength is obtained through calculating knowledge point relationship strength of knowledge points in a set of knowledge points; and recommendation is given to the user for learning knowledge according to knowledge point relationship strength, so as to help the user to learn key knowledge points selectively in a more objective and effective manner, and avoid the problem in the prior art that information recommendation is based on fuzzy logical information recommendation technology, however, fuzzy logic algorithms have lower accuracy and poor adaptability; meanwhile, these methods need users profiles and it is difficult to trace users' profiles updated in real time; also, these methods may only obtain information or knowledge points of interest, but not key knowledge points.

Embodiment 5

Figure 3:
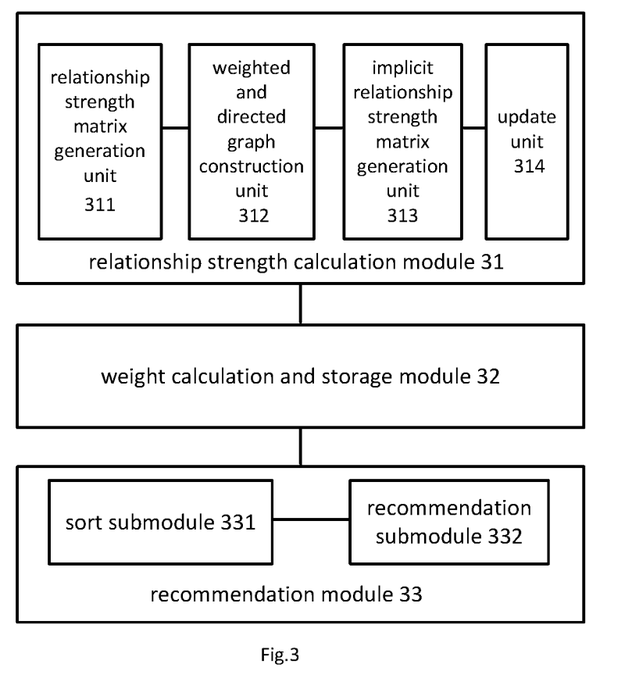
FIG. 3 is a structural diagram of a key knowledge point recommendation system according to an embodiment of this invention.

FIG. 3 is a structural diagram of a key knowledge point recommendation system according to an embodiment of this invention. The key knowledge point recommendation system of this embodiment comprises the following modules:

a relationship strength calculation module 31 for calculating knowledge point relationship strengths of knowledge points in a set of knowledge points. In an embodiment, the relationship strength calculation module 31 calculates knowledge point explicit relationship strengths; calculates knowledge point implicit relationship strengths according to the knowledge point explicit relationship strengths; and calculates knowledge point relationship strengths according to knowledge point explicit relationship strengths and knowledge point implicit relationship strengths.

Figure 4:
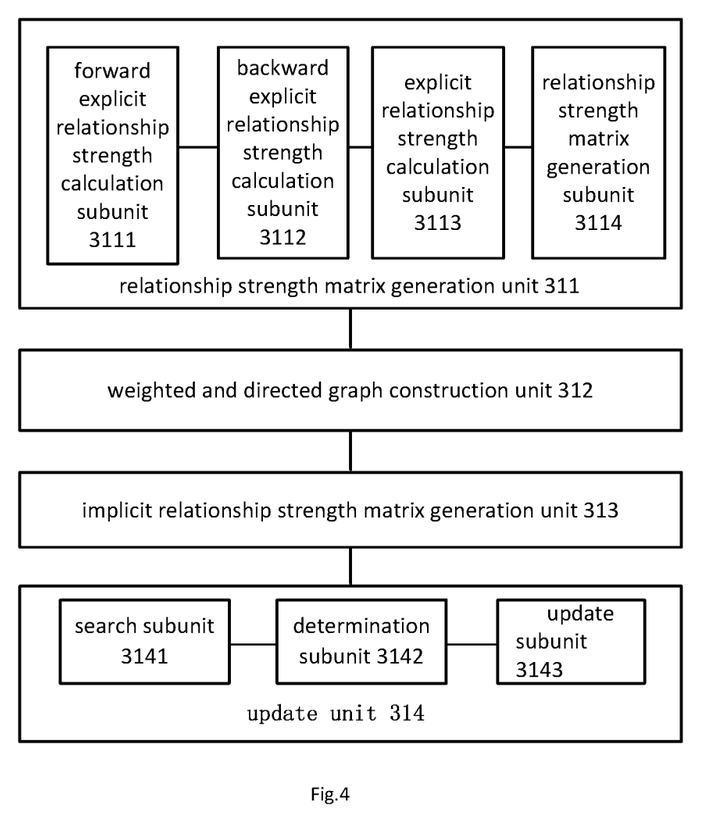
FIG. 4 is a schematic diagram of the relationship strength calculation module according to an embodiment of this invention.

FIG. 4 is a schematic diagram of the relationship strength calculation module according to an embodiment of this invention. As shown in FIG. 4, in this embodiment, the relationship strength calculation module 31 particularly comprises:

a relationship strength matrix generation unit 311 for calculating knowledge point explicit relationship strengths of the knowledge points in the set of knowledge points and generating a knowledge point relationship strength matrix M. In an embodiment, the relationship strength matrix generation unit particularly comprises: a forward explicit relationship strength calculation subunit 3111 for calculating knowledge point forward explicit relationship strengths of knowledge points in the set of knowledge points. A knowledge point forward explicit relationship strength is represented as:

$$f_P(i, j) = \frac{2}{1 + \exp(-\beta\mu)} - 1$$

wherein, $f_p$ (i,j) is the forward explicit relationship strength from knowledge point $o_i$ to knowledge point $o_j$, $\mu$ is the number of times knowledge point $o_j$ appears in the relevant text of knowledge point $o_i$, $\beta$ is a control factor, $0.5 \leq \beta \leq 2$, $\mu$, i, j are non-negative integers, i,j=1, 2, ... n, n is the number of knowledge points. in this embodiment, the control factor $\beta$ is 1.

a backward explicit relationship strength calculation subunit 3112 for calculating knowledge point backward explicit relationship strengths of knowledge points in the set of knowledge points. A knowledge point backward explicit relationship strength is represented as:

$$f_N(i, j) = \frac{f_P(j, i)}{\alpha}$$

wherein, $f_N$ (i,j) is the backward explicit relationship strength from knowledge point $o_i$ to knowledge point $o_j$, $\alpha$ is an association factor, $1 \leq \alpha \leq 5$, $\alpha$ is a positive integer, $f_p$ (j,i) is the forward explicit relationship strength from knowledge point $o_j$ to knowledge point $o_i$.

an explicit relationship strength calculation subunit 3113 for calculating knowledge point explicit relationship strengths according to knowledge point forward explicit relationship strengths and knowledge point backward explicit relationship strengths of knowledge points in the set of knowledge points. A knowledge point explicit relationship strength is represented as:

$$f_E(i, j) = \frac{\alpha(f_P(i, j) + f_N(i, j))}{1 + \alpha}$$

wherein, $f_E$ (i,j) is the explicit relationship strength from knowledge point $o_i$ to knowledge point $o_j$, $f_p$ (i,j) is the forward explicit relationship strength from knowledge point $o_i$ to knowledge point $o_j$, $f_N$ (i,j) is the backward explicit relationship strength from knowledge point $o_i$ to knowledge point $o_j$, $\alpha$ is an association factor, $1 \leq \alpha \leq 5$, and $\alpha$ is a positive integer.

a relationship strength matrix generation subunit 3114 for generating the knowledge point relationship strength matrix M according to the knowledge point explicit relationship strengths of knowledge points in the set of knowledge points.

a weighted and directed graph construction unit 312 for constructing a weighted and directed graph G according to the knowledge point relationship strength matrix. The weighted and directed graph G comprises edges, weights and vertices, wherein, edges and weights are set in the following method: if $M_{ij}>0$, the weight of an edge from knowledge point $o_i$ to knowledge point $o_j$ is set to $-\ln(M_{ij})$; if $M_{ij}=0$, there is not an edge from knowledge point $o_i$ to knowledge point $o_j$ in G, wherein $M_{ij}$ represents explicit relationship strength from knowledge point $o_i$ to knowledge point $o_j$. The weighted and directed graph G has the same vertices with M. The weighted and directed graph G is represented as a matrix.

an implicit relationship strength matrix generation unit 313 for calculating knowledge point implicit relationship strength according to the weighted and directed graph G and generating a knowledge point implicit relationship strength matrix I.

Knowledge point implicit relationship strength is represented as:

$$f_I(i,j) = \exp(-C_{ij})$$

wherein, $f_I$ (i,j) represents the implicit relationship strength from knowledge point $o_i$ to knowledge point $o_j$, $C_{ij}$ represents the shortest path length from knowledge point $o_i$ to knowledge point $o_j$ in the weighted and directed graph G. If there is not a simple path from knowledge point $o_i$ to knowledge point $o_j$, $f_I$ (i,j)=0; the value of implicit relationship strength from a knowledge point to itself is set to 0; the values of implicit relationship strength $f_I$ (i,j) are stored in a matrix to generate a knowledge point implicit relationship strength matrix I.

The shortest path length $C_{ij}$ may be calculated using the Dijkstra algorithm, the SPFA algorithm, the Floyd-Warshall algorithm or the Bellman-Ford algorithm.

an update unit 314 for traversing the knowledge point implicit relationship strength matrix I and updating the knowledge point relationship strength matrix M. in an embodiment, the update unit 314 comprises a search subunit 3141 for traversing each element in the knowledge point implicit relationship strength matrix I; a determination subunit 3142 for determining whether $I_{ij}$ is larger than or smaller than $M_{ij}$; an update subunit 3143 for, if $I_{ij} > M_{ij}$, reassigning $M_{ij} = I_{ij}$ and proceeding to a next element in the knowledge point implicit relationship strength matrix I after updating the knowledge point relationship strength matrix M; if $I_{ij} \leq M_{ij}$, proceeding to a next element in the knowledge point implicit relationship strength matrix I directly, until the knowledge point implicit relationship strength matrix I is traversed.

a weight calculation and storage module 32 for calculating weights of knowledge points according to the knowledge point relationship strength of the knowledge points in the set of knowledge points and storing the knowledge points and their weights correspondingly.

The process of calculating weights of knowledge points according to the knowledge point relationship strength of knowledge points in the set of knowledge points and storing the knowledge points and their weights correspondingly comprises: according to the knowledge point relationship strength matrix M of knowledge points in the set of knowledge points, obtaining a set $T_i^{out}$ of all edges starting from knowledge point $o_i$ and a set $T_i^{in}$ of all edges ending at knowledge point $o_i$; setting a weight $\omega_i$ of each $o_i$, a weight of each edge in $T_i^{out}$ being multiplied by $\theta^{out}$ and then being added to $\omega_i$, a weight of each edge in $T_i^{in}$ being multiplied by $\theta^{in}$ and then being added to $\omega_i$, the obtained weight $\omega_i$ being stored in a list L, wherein $\theta^{out}$, $\theta^{in}$ are control parameters, and the weight $\omega_i$ of each knowledge point $o_i$ has an initial value setting to zero. The control parameters $\theta^{out} \in [0.1, 10]$, $\theta^{in} \in [0.1, 10]$. In this embodiment, control parameters $\theta^{out}=1$, $\theta^{in}=2$. knowledge points in the set of knowledge points and their weights are correspondingly stored in the list L.

a recommendation module 33 for determining key knowledge points according to the weights of the knowledge points and recommending the key knowledge points to a user, which particularly comprises: a sort submodule 331 for sorting the knowledge points in descending order of the weight of the knowledge points and updating the list L of the knowledge points; a recommendation submodule 332 for selecting the first K knowledge points from the list L of knowledge points in the set of knowledge points as key knowledge points and recommending these key knowledge points to the user, wherein K is an integer larger than or equal to 2; K is in a range of $2 \leq K \leq 45$. In this embodiment, K=2.

In the key knowledge point recommendation system of this embodiment, with the key knowledge point recommendation method above, the problem in the prior art may be effectively avoided, i.e., information recommendation in the prior art is based on fuzzy logical information recommendation technology, however, fuzzy logic algorithms have lower accuracy and poor adaptability; meanwhile, these methods need users profiles and it is difficult to trace users' profiles updated in real time; also, these methods may only obtain information or knowledge points of interest, but not key knowledge points.

Obviously, the above embodiments are merely examples given for clear description, but not limitations of this invention. For those skilled in the art, other modifications or variations may be made based on the above description, which will not be and cannot be listed exhaustively herein. These apparent modifications or variations derived are still within the protection scope of this invention.

Those skilled in the art should understand that the embodiments of this application can be provided as method, system or products of computer programs. Therefore, this application can use the forms of entirely hardware embodiment, entirely software embodiment, or embodiment combining software and hardware. Moreover, this application can use the form of the product of computer programs to be carried out on one or multiple storage media (including but not limit to disk memory, CD-ROM, optical memory etc.) comprising programming codes that can be executed by computers.

This application is described with reference to the method, equipment (system) and the flow charts and/or block diagrams of computer program products according to the embodiments of the present invention. It should be understood that each flow and/or block in the flowchart and/or block diagrams as well as the combination of the flow and/or block in the flowchart and/or block diagram can be achieved through computer program commands Such computer program commands can be provided to general computers, special-purpose computers, embedded processors or any other processors of programmable data processing equipment so as to generate a machine, so that a device for realizing one or multiple flows in the flow diagram and/or the functions specified in one block or multiple blocks of the block diagram is generated by the commands to be executed by computers or any other processors of the programmable data processing equipment.

Such computer program commands can also be stored in readable memory of computers which can lead computers or other programmable data processing equipment to working in a specific style so that the commands stored in the readable memory of computers generate the product of command device; such command device can achieve one or multiple flows in the flowchart and/or the functions specified in one or multiple blocks of the block diagram.

Such computer program commands can also be loaded on computers or other programmable data processing equipment so as to carry out a series of operation steps on computers or other programmable equipment to generate the process to be achieved by computers, so that the commands to be executed by computers or other programmable equipment achieve the one or multiple flows in the flowchart and/or the functions specified in one block or multiple blocks of the block diagram.

Although preferred embodiments of this application are already described, once those skilled in the art understand basic creative concept, they can make additional modification and alteration for these embodiments. Therefore, the appended claims are intended to be interpreted as encompassing preferred embodiments and all the modifications and alterations within the scope of this application.

What is claimed is:

1. A key knowledge point recommendation method, characterized in comprising the following steps:
calculating knowledge point relationship strengths of knowledge points in a set of knowledge points;
calculating a weight for each knowledge point according to the knowledge point relationship strengths of knowledge points in the set of knowledge points, and storing the knowledge points and their weights correspondingly; and determining key knowledge points according to the weights of the knowledge points and recommending the key knowledge points to a user, wherein, calculating knowledge point relationship strengths of knowledge points in a set of knowledge points comprises:

calculating knowledge point explicit relationship strengths, calculating knowledge point implicit relationship strengths according to the knowledge point explicit relationship strengths, and calculating knowledge point relationship strengths according to the knowledge point explicit relationship strengths and the knowledge point implicit relationship strengths.

2. The key knowledge point recommendation method of claim 1, characterized in that calculating knowledge point relationship strengths of knowledge points in a set of knowledge points comprises:

calculating knowledge point explicit relationship strengths of knowledge points in the set of knowledge points and generating a knowledge point relationship strength matrix M;

constructing a weighted and directed graph G according to the knowledge point relationship strength matrix;

calculating knowledge point implicit relationship strengths according to the weighted and directed graph G and generating a knowledge point implicit relationship strength matrix I;

traversing the knowledge point implicit relationship strength matrix I and updating the knowledge point relationship strength matrix M.

3. The key knowledge point recommendation method of claim 2, characterized in that calculating a weight for each knowledge point according to the knowledge point relationship strengths of knowledge points in the set of knowledge points and storing the knowledge points and their weights correspondingly comprises:

according to the knowledge point relationship strength matrix M of knowledge points in the set of knowledge points, obtaining a set $T_i^{out}$ of all edges starting from knowledge point $o_i$ and a set $T_i^{in}$ of all edges ending at knowledge point $o_i$;

setting a weight $\omega_1$ of each knowledge point $o_i$, a weight of each edge in $T_i^{out}$ being multiplied by $\theta^{out}$ and then being added to $\omega_i$, a weight of each edge in $T_i^{in}$ being multiplied by $\theta^{in}$ and then being added to $\omega_i$, the obtained weight $\omega_i$ being stored in a list L, wherein $\theta^{out}$, $\theta^{in}$ are control parameters, and the weight $\omega_i$ of each knowledge point $o_i$ has an initial value setting to zero.

4. The key knowledge point recommendation method of claim 1, characterized in that determining key knowledge points according to the weights of the knowledge points and recommending the key knowledge points to a user comprises:

sorting the knowledge points in descending order of the weight of the knowledge points and updating the list L of the knowledge points;

selecting the first K knowledge points from the list L of knowledge points in the set of knowledge points as key knowledge points and recommending these key knowledge points to the user, wherein K is an integer larger than or equal to 2.

5. The key knowledge point recommendation method of claim 1, characterized in that calculating knowledge point explicit relationship strengths of knowledge points in the set of knowledge points comprises:

calculating knowledge point forward explicit relationship strengths of knowledge points in the set of knowledge points;

calculating knowledge point backward explicit relationship strengths of knowledge points in the set of knowledge points;

calculating knowledge point explicit relationship strengths according to the knowledge point forward explicit relationship strengths and the knowledge point backward explicit relationship strengths of knowledge points in the set of knowledge points;

generating the knowledge point relationship strength matrix M according to the knowledge point explicit relationship strengths of knowledge points in the set of knowledge points.

6. The key knowledge point recommendation method of claim 2, characterized in that traversing the knowledge point implicit relationship strength matrix I and updating the knowledge point relationship strength matrix M comprises:

traversing each element in the knowledge point implicit relationship strength matrix I;

determining whether $I_{ij}$ is larger than or smaller than $M_{ij}$;

if $I_{ij} > M_{ij}$, reassigning $M_{ij} = I_{ij}$ and proceeding to a next element in the knowledge point implicit relationship strength matrix I after updating the knowledge point relationship strength matrix M;

if $I_{ij} \leq M_{ij}$, proceeding to a next element in the knowledge point implicit relationship strength matrix I directly, until the knowledge point implicit relationship strength matrix I is traversed.

7. The key knowledge point recommendation method of claim 5, characterized in that a knowledge point forward explicit relationship strength is represented as:

$$f_P(i, j) = \frac{2}{1 + \exp(-\beta\mu)} - 1$$

wherein, $f_p(i,j)$ is the forward explicit relationship strength from knowledge point $o_i$ to knowledge point $o_j$, $\mu$ is the number of times knowledge point $o_j$ appears in the relevant text of knowledge point $o_i$, $\beta$ is a control factor, $0.5 \leq \beta \leq 2$, $\mu, i, j$ are non-negative integers, $i,j=1, 2, \ldots n$, n is the number of knowledge points;

a knowledge point backward explicit relationship strength is represented as:

$$f_N(i, j) = \frac{f_P(j, i)}{\alpha}$$

wherein, $f_N(i,j)$ is the backward explicit relationship strength from knowledge point $o_i$ to knowledge point $o_j$, $\alpha$ is an association factor, $1 \leq \alpha \leq 5$, $\alpha$ is a positive integer, $f_p(j,i)$ is forward explicit relationship strength from knowledge point $o_j$ to knowledge point $o_i$;

a knowledge point explicit relationship strength is represented as:

$$f_E(i, j) = \frac{\alpha(f_P(i, j) + f_N(i, j))}{1 + \alpha}$$

wherein, $f_E$ (i,j) is the explicit relationship strength from knowledge point $o_i$ to knowledge point $o_j$, $f_P$ (i,j) is forward explicit relationship strength from knowledge point $o_i$ to knowledge point $o_j$, $f_N$ (i,j) is backward explicit relationship strength from knowledge point $o_j$ to knowledge point $o_j$, $\alpha$ is an association factor, $1 \le \alpha \le 5$, and $\alpha$ is a positive integer.

8. The key knowledge point recommendation method of claim 2, characterized in that the weighted and directed graph G comprises edges, weights and vertices,
wherein, edges and weights are set in the following method:
if $M_{ij} > 0$, the weight of an edge from knowledge point $o_i$ to knowledge point $o_j$ is set to $-\ln(M_{ij})$; if $M_{ij} = 0$, there is not an edge from knowledge point $o_i$ to knowledge point $o_j$ in G, wherein $M_{ij}$ represents the explicit relationship strength from knowledge point $o_i$ to knowledge point $o_j$;
the weighted and directed graph G has the same vertices with M.

9. The key knowledge point recommendation method of claim 2, characterized in that a knowledge point implicit relationship strength is represented as:

$$f_I(i,j)=\exp(-C_{ij})$$

wherein, $f_I(i,j)$ represents the implicit relationship strength from knowledge point $o_i$ to knowledge point $o_j$, $C_{ij}$ represents the shortest path length from knowledge point $o_i$ to knowledge point $o_j$ in the weighted and directed graph G;
if there is not a simple path from knowledge point $o_i$ to knowledge point $o_j$, $f_I$ (i,j)=0; the value of implicit relationship strength from a knowledge point to itself is set to 0;
the values of implicit relationship strength $f_I$ (i,j) are stored in a matrix to generate a knowledge point implicit relationship strength matrix I.

10. The key knowledge point recommendation method of claim 3, characterized in that the control parameters $\theta^{out} \in [0.1,10], \theta^{in} \in [0.1,10]$.

11. The key knowledge point recommendation method of claim 4, characterized in that K is in a range of $2 \le K \le 45$.

12. A key knowledge point recommendation system in a computer, characterized in comprising:
a relationship strength calculation module for calculating knowledge point relationship strengths of knowledge points in a set of knowledge points;
a weight calculation and storage module for calculating weights of knowledge points according to the knowledge point relationship strengths of the knowledge points in the set of knowledge points, and storing the knowledge points and their weights correspondingly; and
a recommendation module for determining key knowledge points according to the weights of the knowledge points and recommending the key knowledge points to a user,
wherein the relationship strength calculation module is used for calculating knowledge point explicit relationship strengths, calculating knowledge point implicit relationship strengths according to the knowledge point explicit relationship strengths, and calculating knowledge point relationship strengths according to the knowledge point explicit relationship strengths and the knowledge point implicit relationship strengths.

13. The key knowledge point recommendation system of claim 12, characterized in that the relationship strength calculation module comprises:
a relationship strength matrix generation unit for calculating knowledge point explicit relationship strengths of the knowledge points in the set of knowledge points and generating a knowledge point relationship strength matrix M;
a weighted and directed graph construction unit for constructing a weighted and directed graph G according to the knowledge point relationship strength matrix;
an implicit relationship strength matrix generation unit for calculating knowledge point implicit relationship strengths according to the weighted and directed graph G and generating a knowledge point implicit relationship strength matrix I;
an update unit for traversing the knowledge point implicit relationship strength matrix I and updating the knowledge point relationship strength matrix M.

14. The key knowledge point recommendation system of any of claim 12, characterized in that the weight calculation and storage module is used for: according to knowledge point relationship strength matrix M of knowledge points in the set of knowledge points, obtaining a set $T_i^{out}$ of all edges starting from knowledge point $o_i$ and a set $T_i^{in}$ of all edges ending at knowledge point $o_j$; setting a weight $\omega_i$ of each knowledge point $o_j$, a weight of each edge in $T_i^{out}$ being multiplied by $\theta^{out}$ and then being added to $\omega_i$, a weight of each edge in $T_i^{in}$ being multiplied by $\theta^{in}$ and then being added to $\omega_i$, the obtained weight $\omega_i$ being stored in a list L, wherein $\theta^{out}$, $\theta^{in}$ are control parameters, and the weight $\omega_i$ of each knowledge point $o_j$ has an initial value setting to zero.

15. The key knowledge point recommendation system of claim 12, characterized in that the recommendation module comprises:
a sort submodule for sorting the knowledge points in descending order of the weight of the knowledge points and updating the list L of the knowledge points;
a recommendation submodule for selecting the first K knowledge points from the list L of knowledge points in the set of knowledge points as key knowledge points and recommending these key knowledge points to the user, wherein K is an integer larger than or equal to 2.

16. The key knowledge point recommendation system of claim 12, characterized in that the relationship strength matrix generation unit comprises:
a forward explicit relationship strength calculation subunit for calculating knowledge point forward explicit relationship strengths of knowledge points in the set of knowledge points;
a backward explicit relationship strength calculation subunit for calculating knowledge point backward explicit relationship strengths of knowledge points in the set of knowledge points;
an explicit relationship strength calculation subunit for calculating knowledge point explicit relationship strengths according to the knowledge point forward explicit relationship strengths and the knowledge point backward explicit relationship strengths of knowledge points in the set of knowledge points;
a relationship strength matrix generation subunit for generating the knowledge point relationship strength matrix M according to the knowledge point explicit relationship strengths of knowledge points in the set of knowledge points.

17. The key knowledge point recommendation system of claim 13, characterized in that the update unit comprises:
- a search subunit for traversing each element in the knowledge point implicit relationship strength matrix I;
- a determination subunit for determining whether $I_{ij}$ is larger than or smaller than $M_{ij}$;
- an update subunit for, if $I_{ij} > M_{ij}$, reassigning $M_{ij} = I_{ij}$ and proceeding to a next element in the knowledge point implicit relationship strength matrix I after updating the knowledge point relationship strength matrix M; if $I_{ij} \leq M_{ij}$, proceeding to a next element in the knowledge point implicit relationship strength matrix I directly, until the knowledge point implicit relationship strength matrix I is traversed.

18. The key knowledge point recommendation system of claim 16, characterized in that a knowledge point forward explicit relationship strength is represented as:

$$f_P(i, j) = \frac{2}{1 + \exp(-\beta\mu)} - 1$$

wherein, $f_P$ (i,j) is the forward explicit relationship strength from knowledge point $o_i$ to knowledge point $o_j$, $\mu$ is the number of times knowledge point $o_j$ appears in the relevant text of knowledge point $o_i$, $\beta$ is a control factor, $0.5 \leq \beta \leq 2$, $\mu, i, j$ are non-negative integers, $i,j=1, 2, \ldots n$, n is the number of knowledge points;

a knowledge point backward explicit relationship strength is represented as:

$$f_N(i, j) = \frac{f_P(j, i)}{\alpha}$$

wherein, $f_N$ (i,j) is the backward explicit relationship strength from knowledge point $o_i$ to knowledge point $o_j$, $\alpha$ is an association factor, $1 \leq \alpha \leq 5$, $\alpha$ is a positive integer, $f_P$ (j,i) is the forward explicit relationship strength from knowledge point $o_j$ to knowledge point $o_i$;

a knowledge point explicit relationship strength is represented as:

$$f_E(i, j) = \frac{\alpha(f_P(i, j) + f_N(i, j))}{1 + \alpha}$$

wherein, $f_E$ (i,j) is the explicit relationship strength from knowledge point $o_i$ to knowledge point $o_j$, $f_P$ (i,j) is the forward explicit relationship strength from knowledge point $o_i$ to knowledge point $o_j$, $f_N$ (i,j) is the backward explicit relationship strength from knowledge point $o_i$ to knowledge point $o_j$, $\alpha$ is an association factor, $1 \leq \alpha \leq 5$, and $\alpha$ is a positive integer.

19. The key knowledge point recommendation system of claim 13, characterized in that the weighted and directed graph G comprises edges, weights and vertices, wherein, edges and weights are set in the following method:
- if $M_{ij} > 0$, the weight of an edge from knowledge point $o_j$ to knowledge point $o_j$ is set to $-\ln(M_{ij})$; if $M_{ij} = 0$, there is not an edge from knowledge point $o_i$ to knowledge point $o_j$ in G, wherein $M_{ij}$ represents explicit relationship strength from knowledge point $o_i$ to knowledge point $o_j$;
- the weighted and directed graph G has the same vertices with M.

20. The key knowledge point recommendation system of claim 13, characterized in that a knowledge point implicit relationship strength is represented as:

$$f_I(i,j) = \exp(-C_{ij})$$

wherein, $f_I$ (i,j) represents the implicit relationship strength from knowledge point $o_i$ to knowledge point $o_j$, $C_{ij}$ represents the shortest path length from knowledge point $o_i$ to knowledge point $o_j$ in the weighted and directed graph G;

if there is not a simple path from knowledge point $o_i$ to knowledge point $o_j$, $f_I(i,j) = 0$; the value of implicit relationship strength from a knowledge point to itself is set to 0;

the values of implicit relationship strength $f_I$ (i,j) are stored in a matrix to generate a knowledge point implicit relationship strength matrix I.

21. The key knowledge point recommendation system of claim 14, characterized in that the control parameters $\theta^{out} \in [0.1, 10]$, $\theta^{in} \in [0.1, 10]$.

22. The key knowledge point recommendation system of claim 15, characterized in that K is in a range of $2 \leq K \leq 45$.

23. One or more non-transitory computer readable mediums having stored thereon computer-executable instructions that when executed by a computer perform a key knowledge point recommendation method, the method comprising:
- calculating knowledge point relationship strengths of knowledge points in a set of knowledge points;
- calculating weights of knowledge points according to the knowledge point relationship strengths of knowledge points in the set of knowledge points, and storing the knowledge points and their weights correspondingly; and
- determining key knowledge points according to the weights of the knowledge points and recommending the key knowledge points to a user, wherein, calculating knowledge point relationship strengths of knowledge points in a set of knowledge points comprises:
- calculating knowledge point explicit relationship strengths,
- calculating knowledge point implicit relationship strengths according to the knowledge point explicit relationship strengths, and
- calculating knowledge point relationship strengths according to the knowledge point explicit relationship strengths and the knowledge point implicit relationship strengths.

* * * * *